United States Patent
Jiang et al.

(10) Patent No.: US 8,243,029 B2
(45) Date of Patent: *Aug. 14, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 911 days.

This patent is subject to a terminal disclaimer.

(21) Appl. No.: 12/286,144

(22) Filed: Sep. 29, 2008

(65) Prior Publication Data

US 2009/0153502 A1    Jun. 18, 2009

(30) Foreign Application Priority Data

Dec. 14, 2007   (CN) .......................... 2007 1 0125111

(51) Int. Cl.
*G06F 3/041* (2006.01)
*G09G 3/20* (2006.01)

(52) U.S. Cl. ........... 345/173; 345/55; 428/221; 977/742

(58) Field of Classification Search .................... None
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |

(Continued)

FOREIGN PATENT DOCUMENTS

CN        2539375        3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003, 32(8)(lines from the 4th line to 35th line in the right column of p. 507 may be relevant).

(Continued)

*Primary Examiner* — Andrew L Sniezek
(74) *Attorney, Agent, or Firm* — Altis Law Group, Inc.

(57) ABSTRACT

An exemplary touch panel includes a substrate, transparent conductive layers, a capacitive sensing circuit, and conductive wires. The transparent conductive layers are disposed on a surface of the substrate and spaced apart from each other. Each transparent conductive layer includes a carbon nanotube layer. The carbon nanotube layer includes carbon nanotubes. The conductive wires respectively electrically connect the transparent conductive layers to the capacitive sensing circuit. A display device using the touch panel is also provided.

20 Claims, 6 Drawing Sheets

U.S. PATENT DOCUMENTS

| | | | |
|---|---|---|---|
| 7,084,933 B2 * | 8/2006 | Oh et al. .................. | 349/12 |
| 7,196,463 B2 | 3/2007 | Okai et al. | |
| 7,215,329 B2 | 5/2007 | Yoshikawa et al. | |
| 7,242,136 B2 | 7/2007 | Kim et al. | |
| 7,336,261 B2 | 2/2008 | Yu | |
| 7,348,966 B2 | 3/2008 | Hong et al. | |
| 7,532,182 B2 | 5/2009 | Tseng et al. | |
| 7,593,004 B2 | 9/2009 | Spath et al. | |
| 7,630,040 B2 | 12/2009 | Liu et al. | |
| 7,662,732 B2 | 2/2010 | Choi et al. | |
| 7,663,607 B2 | 2/2010 | Hotelling et al. | |
| 7,704,480 B2 | 4/2010 | Jiang et al. | |
| 7,710,649 B2 | 5/2010 | Feng et al. | |
| 7,796,123 B1 | 9/2010 | Irvin, Jr. et al. | |
| 7,825,911 B2 | 11/2010 | Sano et al. | |
| 7,854,992 B2 | 12/2010 | Fu et al. | |
| 7,947,977 B2 | 5/2011 | Jiang et al. | |
| 2002/0089492 A1 | 7/2002 | Ahn et al. | |
| 2003/0122800 A1 * | 7/2003 | Yu ............................... | 345/173 |
| 2003/0147041 A1 | 8/2003 | Oh et al. | |
| 2003/0189235 A1 | 10/2003 | Watanabe et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kawase et al. | |
| 2005/0209392 A1 | 9/2005 | Luo et al. | |
| 2006/0010996 A1 | 1/2006 | Jordan et al. | |
| 2006/0022221 A1 * | 2/2006 | Furukawa et al. ............ | 257/222 |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0187369 A1 | 8/2006 | Chang | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 * | 12/2006 | Spath et al. ................... | 345/173 |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0029292 A1 | 2/2008 | Takayama et al. | |
| 2008/0088219 A1 | 4/2008 | Yoon et al. | |
| 2008/0129666 A1 | 6/2008 | Shimotono et al. | |
| 2008/0138589 A1 | 6/2008 | Wakabayashi et al. | |
| 2008/0192014 A1 | 8/2008 | Kent et al. | |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |
| 2011/0174619 A1 * | 7/2011 | Lieber et al. .................. | 204/450 |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |

| | | |
|---|---|---|
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 200727163 | 7/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
Fan et al. "Self-Oriented Regular Arrays of Carbon Nanotubes and Their Field Emission Properties". Science, vol. 283, (1999); pp. 512-514.
Susuki et al."Investigation of physical and electric properties of silver pastes as binder for thermoelectric materials". Review of Scientific Instruments,76,(2005);pp. 023907-1 to 023907-5.
Wu et al."Transparent, Conductive Carbon Nanotube Films". Science,vol. 305,(2004);pp. 1273-1276.
ASM Handbook."vol. 2 Properties and Selection: Nonferrous Alloys and Special-Purpose Materials".Apr. 2007; pp. 840-853.
Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).
Mei Zhang etal., "Strong Transparent, Multifunctional, Carbon Nanotube Sheets", Science, America, AAAS, vol. 309, pp. 1215-1219, Aug. 19, 2005.
Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).
George Gruner, "Carbon Nanonets Spark New Electronics", Scientific American, pp. 76-83, May 2007.
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

* cited by examiner

TOUCH PANEL AND DISPLAY DEVICE USING THE SAME

RELATED APPLICATIONS

This application is related to commonly-assigned applications entitled, "TOUCH PANEL", filed Sep. 29, 2008 application Ser. No. 12/286,266; "TOUCH PANEL AND DISPLAY DEVICE USING THE SAME", filed Sep. 29, 2008 application Ser. No. 12/286,181; "TOUCH PANEL AND DISPLAY DEVICE USING THE SAME", filed Sep. 29, 2008 application Ser. No. 12/286,154; "TOUCH PANEL AND DISPLAY DEVICE USING THE SAME", filed Sep. 29, 2008 application Ser. No. 12/286,189; "TOUCH PANEL AND DISPLAY DEVICE USING THE SAME", filed Sep. 29, 2008 application Ser. No. 12/286,176; "ELECTRONIC ELEMENT HAVING CARBON NANOTUBES", filed Sep. 29, 2008 application Ser. No. 12/286,143; "TOUCH PANEL AND DISPLAY DEVICE USING THE SAME", filed Sep. 29, 2008 application Ser. No. 12/286, 166; "TOUCH PANEL AND DISPLAY DEVICE USING THE SAME", filed Sep. 29, 2008 application Ser. No. 12/286,178; "TOUCH PANEL AND DISPLAY DEVICE USING THE SAME", filed Sep. 29, 2008 application Ser. No. 12/286,148; "TOUCHABLE CONTROL DEVICE", filed Sep. 29, 2008 application Ser. No. 12/286,140; "TOUCH PANEL AND DISPLAY DEVICE USING THE SAME", filed Sep. 29, 2008 application Ser. No. 12/286,146; "TOUCH PANEL AND DISPLAY DEVICE USING THE SAME", filed Sep. 29, 2008 application Ser. No. 12/286,216; "TOUCH PANEL AND DISPLAY DEVICE USING THE SAME", filed Sep. 29, 2008 application Ser. No. 12/286,152; "TOUCH PANEL AND DISPLAY DEVICE USING THE SAME", filed Sep. 29, 2008 application Ser. No. 12/286,145; "TOUCH PANEL, METHOD FOR MAKING THE SAME, AND DISPLAY DEVICE ADOPTING THE SAME", filed Sep. 29, 2008 application Ser. No. 12/286,155; "TOUCH PANEL AND DISPLAY DEVICE USING THE SAME", filed Sep. 29, 2008 application Ser. No. 12/286,179; "TOUCH PANEL, METHOD FOR MAKING THE SAME, AND DISPLAY DEVICE ADOPTING THE SAME", filed Sep. 29, 2008 application Ser. No. 12/286,228; "TOUCH PANEL AND DISPLAY DEVICE USING THE SAME", filed Sep. 29, 2008 application Ser. No. 12/286,153; "TOUCH PANEL AND DISPLAY DEVICE USING THE SAME", filed Sep. 29, 2008 application Ser. No. 12/286,184; "METHOD FOR MAKING TOUCH PANEL", filed Sep. 29, 2008 application Ser. No. 12/286,175; "METHOD FOR MAKING TOUCH PANEL", filed Sep. 29, 2008 application Ser. No. 12/286,195; "TOUCH PANEL AND DISPLAY DEVICE USING THE SAME", filed Sep. 29, 2008 application Ser. No. 12/286,160; "TOUCH PANEL AND DISPLAY DEVICE USING THE SAME", filed Sep. 29, 2008 application Ser. No. 12/286,220; "TOUCH PANEL AND DISPLAY DEVICE USING THE SAME", filed Sep. 29, 2008 application Ser. No. 12/286,227; "TOUCH PANEL", filed Sep. 29, 2008 application Ser. No. 12/286,141; "TOUCH PANEL AND DISPLAY DEVICE USING THE SAME", filed Sep. 29, 2008 application Ser. No. 12/286,218; "TOUCH PANEL AND DISPLAY DEVICE USING THE SAME", filed Sep. 29, 2008 application Ser. No. 12/286,142; "TOUCH PANEL AND DISPLAY DEVICE USING THE SAME", filed Sep. 29, 2008 application Ser. No. 12/286,241; "TOUCH PANEL, METHOD FOR MAKING THE SAME, AND DISPLAY DEVICE ADOPTING THE SAME", filed Sep. 29, 2008 application Ser. No. 12/286,151; and "TOUCH PANEL, METHOD FOR MAKING THE SAME, AND DISPLAY DEVICE ADOPTING THE SAME", filed Sep. 29, 2008 application Ser. No. 12/286,219. The disclosures of the above-identified applications are incorporated herein by reference.

BACKGROUND

1. Field of the Invention

The present invention relates to touch panels and, particularly, to a carbon-nanotube-based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels in front of their respective display devices (e.g., a display such as a liquid crystal panel). A user of any such electronic apparatus operates it by pressing or touching the touch panel with a finger, a pen, a stylus, or a like tool while visually observing the display device through the touch panel. A demand thus exists for touch panels that are superior in visibility and reliable in operation.

Up to the present time, different types of touch panels, including resistance, capacitance, infrared, and surface sound wave types, have been developed. The capacitance-type touch panel has advantages such as higher accuracy and excellent transparency, and thus has been widely used.

A conventional capacitance-type touch panel includes a glass substrate, a transparent conductive layer, and four electrodes. The material of the transparent conductive layer can be selected from a group consisting of indium tin oxide (ITO) and antimony tin oxide (ATO). The electrodes are made of metal and separately formed on a surface of the transparent conductive layer. Further, a protective layer is formed on the surface of the transparent conductive layer, and opposite to the substrate. The material of the protective layer has insulative and transparent characteristics.

In operation, an upper surface of the touch panel is pressed/touched with a touch tool, such as a user's finger or an electrical pen/stylus. Concordantly, visual observation of a screen on the liquid crystal display device provided on a backside of the touch panel is provided. In use, due to an electrical field of the user, a coupling capacitance forms between the user and the transparent conductive layer. For high frequency electrical current, the coupled capacitance is a conductor, and thus the touch tool takes away a little current from the touch point. Current flowing through the four electrodes cooperatively replaces the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

The optically transparent conductive layer (e.g., ITO layer) is generally formed by means of ion-beam sputtering, and this method is relatively complicated. Furthermore, the ITO layer has generally poor mechanical durability, low chemical endurance, and uneven resistance over an entire area of the touch panel. Additionally, the ITO layer has relatively low transparency. All the above-mentioned problems of the ITO layer tend to yield a touch panel with relatively low sensitivity, accuracy, and brightness.

What is needed, therefore, is to provide a durable touch panel with high sensitivity, accuracy, and brightness, and a display device using the same.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present touch panel and display device using the same.

Figure 1:
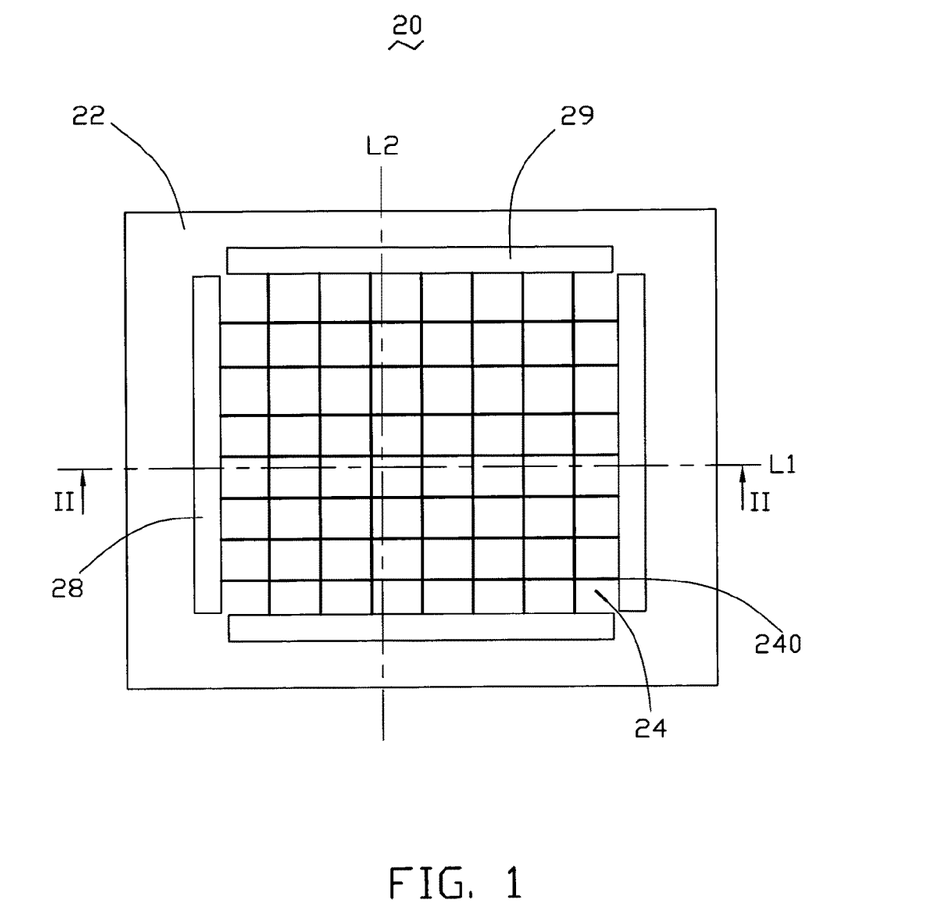
FIG. 1 is a schematic view of a partially assembled touch panel, in accordance with a present embodiment.
Figure 2:
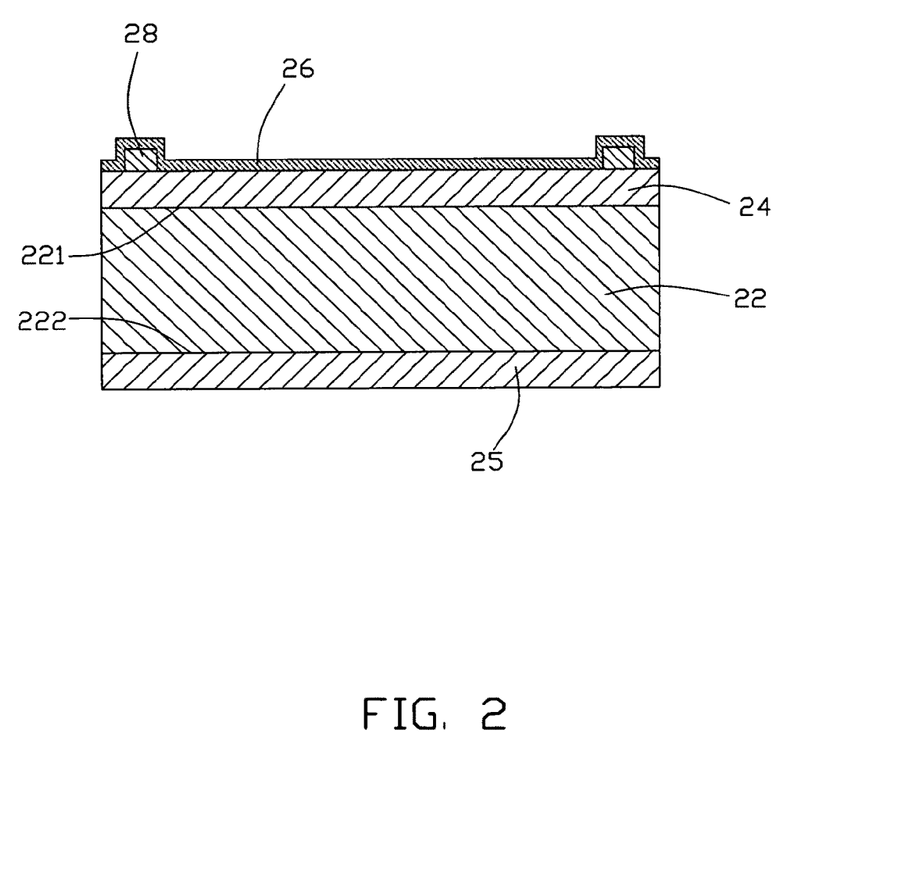
FIG. 2 is a cross-sectional schematic view of the touch panel of the present embodiment, taken along a line II-II of FIG. 1.

Referring to FIG. 1 and FIG. 2, a touch panel 20 includes a substrate 22, a transparent conductive layer 24, a transparent protective film 26, two first electrodes 28, and two second electrodes 29. The substrate 22 has a first surface 221 and a second surface 222 at opposite sides thereof respectively. The transparent conductive layer 24 is disposed on the first surface 221. The transparent conductive layer 24 includes a plurality of carbon nanotube wires 240, some of which are arranged in parallel along a first direction L1 and the remainder arranged in parallel along a second direction L2. The first direction L1 is different from the second direction L2 (i.e., the first direction L1 intersects the second direction L2). In different embodiments, the carbon nanotube wires 240 can either be contactingly arranged or spaced apart from each other. In the present embodiment, the carbon nanotube wires 240 are spaced apart. The distance between parallel nanotube wires 240 is in an approximate range from 5 nanometers to 1 millimeter.

The ends of the carbon nanotube wires 240 arranged along the first direction are electrically connected to the first electrodes 28. The opposite ends of the carbon nanotube wires 240 arranged along the second direction are electrically connected to the second electrodes 29. Thereby the nanotube wires form an equipotential surface on the transparent conductive layer 24. The transparent protective film 26 covers the first electrodes 28, the second electrodes 29, and the exposed surface of the transparent conductive layer 24, and opposite to the substrate 22.

The substrate 22 has a planar structure or a curved structure. The material of the substrate 22 can be selected selected from glass, quartz, diamond, plastics, and other suitable materials. The substrate 22 is made from a transparent material. And it can be either flexible or stiff, depending on whether a flexible device is desired or not. The substrate 22 is used to support the transparent conductive layer 24.

The transparent conductive layer 24 includes a plurality of intersected carbon nanotube wires. Each of the carbon nanotube wires 240 includes a plurality of successive carbon nanotubes joined end to end by the van der Waals attractive force. Specifically, referring to FIGS. 3 to 5, each carbon nanotube wires 240 comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. It is to be noted that the carbon nanotube segments of the carbon nanotube wires 240 can be untwisted or twisted to form untwisted carbon nanotube wires 240 or twisted carbon nanotube wires 240.

Figure 3:
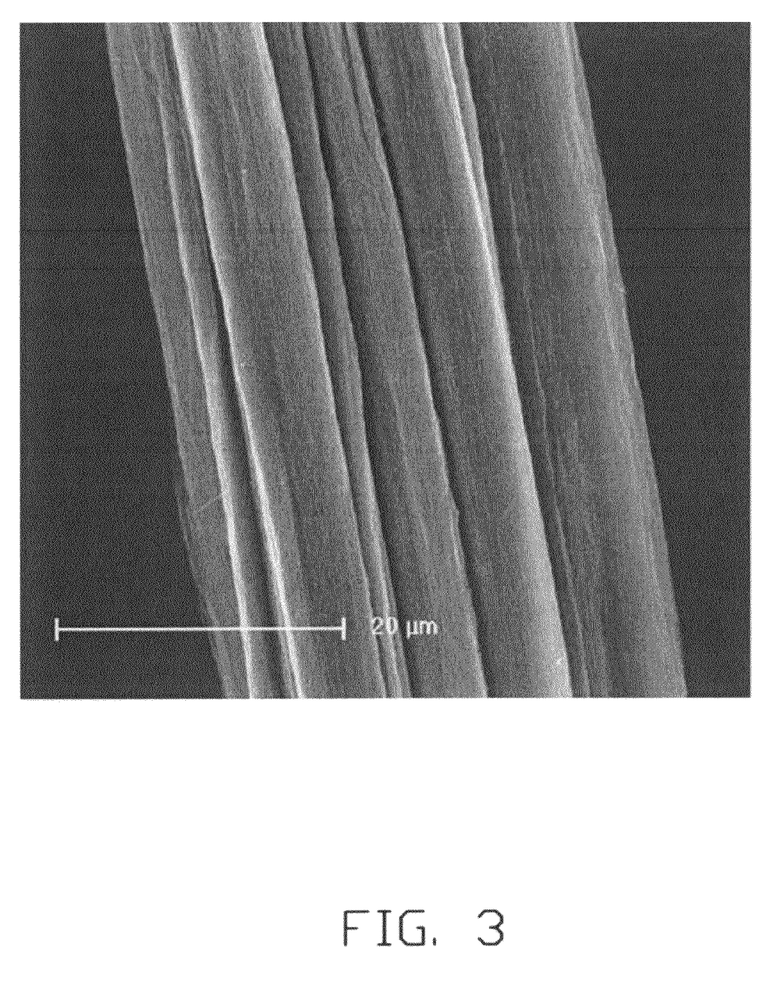
FIG. 3 shows a Scanning Electron Microscope (SEM) image of an untwisted carbon nanotube wire employed in the touch panel of FIG. 1.
Figure 4:
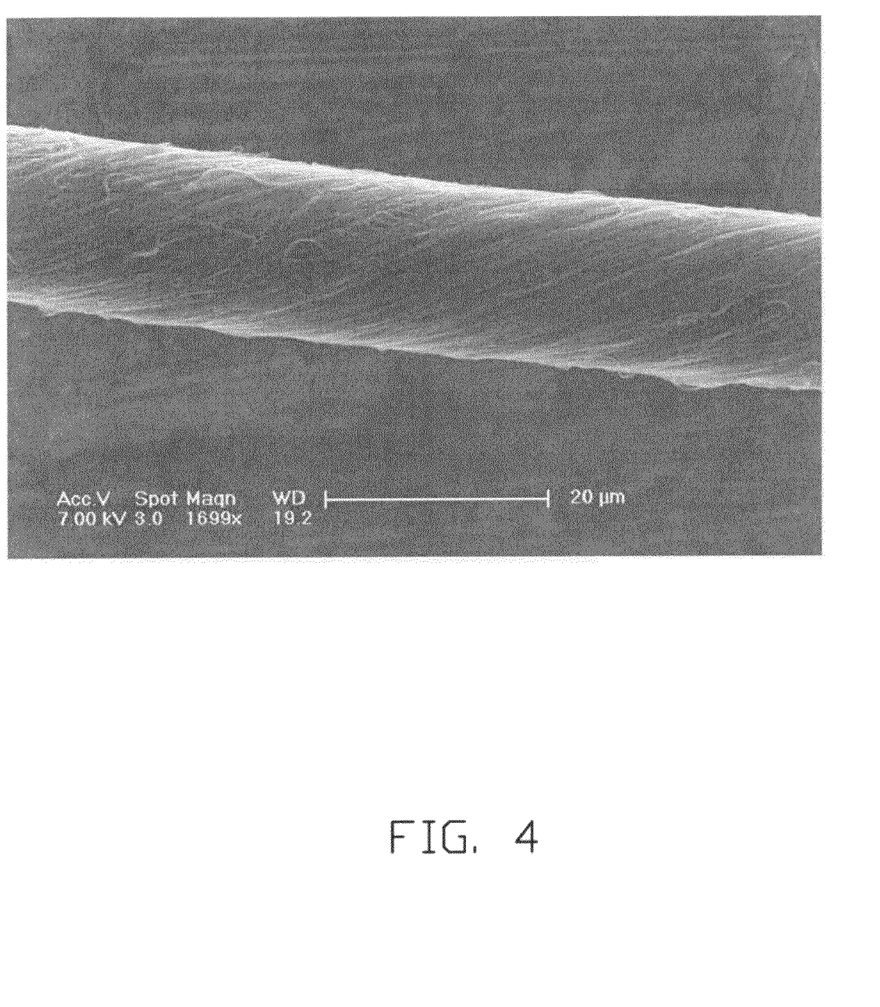
FIG. 4 shows a Scanning Electron Microscope (SEM) image of a twisted carbon nanotube wire employed in the touch panel of FIG. 1.

A diameter of each carbon nanotube wire 240 is in an approximate range from 0.5 nanometers to 100 micrometers ($\mu m$) (i.e. approximately 0.5 nm to approximately 100 $\mu m$). The carbon nanotubes in the carbon nanotube wires 240 can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers. The carbon nanotube wires 240 are separated from one another by a substantially uniform distance, which is approximately in the range from 5 nm to 1 millimeter (mm).

Moreover, for uniform transparency, an optical compensation membrane (not shown) is disposed between each two adjacent carbon nanotube wires. The material of the optical compensation membrane typically has the same optical parameters (e.g. refractive index and transparency) as the transparent conductive layer 24.

A method for fabricating the above-described transparent conductive layer 24 includes the steps of: (a) providing an array of carbon nanotubes, specifically, providing a super-aligned array of carbon nanotubes; (b) pulling out a carbon nanotube structure (carbon nanotube film or carbon nanotube yarn) from the array of carbon nanotubes, by using a tool (for example, adhesive tape, pliers, tweezers, or another tool allowing multiple carbon nanotubes to be gripped and pulled simultaneously); (c) treating the carbon nanotube structure with an organic solvent or mechanical force to form a carbon nanotube wire 240; and (d) placing a plurality of above-described carbon nanotube wires in parallel and with a distance on the base 22, thereby forming the transparent conductive layer 24.

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In this embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes parallel to each other and approximately perpendicular to the substrate. The carbon nanotubes in the array of carbon nanotubes can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the carbon nanotube structure, film or yarn, can be formed by the substeps of: (b1) selecting a plurality of carbon nanotubes having a predetermined width from the array of carbon nanotubes; and (b2) pulling the carbon nanotubes to form nanotube segments 143 at an even/uniform speed to achieve a uniform carbon nanotube structure. A yarn is a narrow film.

The selected one or more carbon nanotubes have a predetermined width, and can be selected using a tool such as adhesive tape, pliers, or tweezers. The tool contacts the super-aligned array of carbon nanotubes and allows multiple carbon nanotubes to be gripped and pulled simultaneously. The pulling direction can be substantially perpendicular to the growing direction of the super-aligned array of carbon nanotubes.

Figure 5:
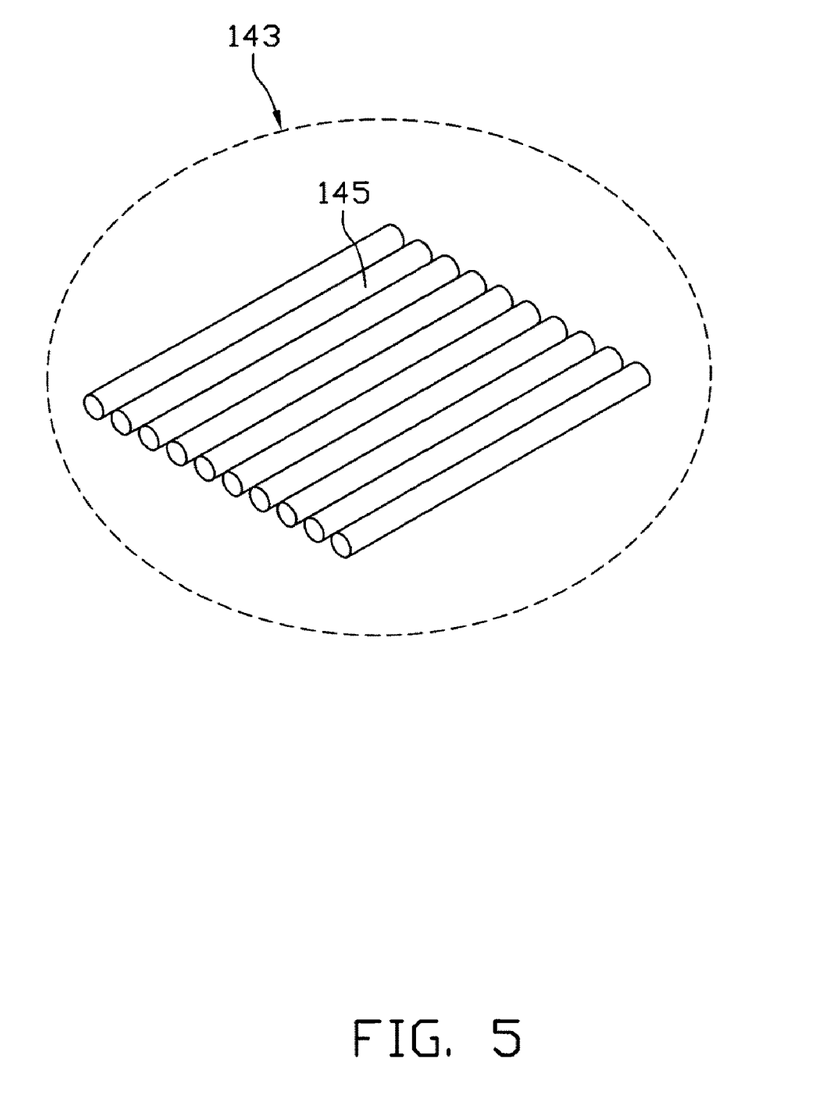
FIG. 5 is a structural schematic of a carbon nanotube segment.

Referring to FIG. 5, more specifically, during the pulling process, as the initial carbon nanotube segments 143 are drawn out, other carbon nanotube segments are also drawn out end to end due to van der Waals attractive force between ends of adjacent segments 143. This process of drawing ensures a substantially continuous and uniform carbon nanotube structure having a predetermined width can be formed. The carbon nanotube structure includes a plurality of carbon nanotubes joined ends to ends. The carbon nanotubes in the carbon nanotube structure are all substantially parallel to the pulling/drawing direction of the carbon nanotube structure, and the carbon nanotube structure produced in such manner can be selectively formed to have a predetermined width. The carbon nanotube structure formed by the pulling/drawing method has superior uniformity of thickness and conductivity over a typical disordered carbon nanotube film. Further, the pulling/drawing method is simple, fast, and suitable for industrial applications.

In step (c), the carbon nanotube structure is soaked in an organic solvent. Specifically, the carbon nanotube structure can be treated by applying organic solvent to the carbon nanotube structure to soak the entire surface of the carbon nanotube structure. Since the untreated carbon nanotube structure comprises a number of carbon nanotubes, the untreated carbon nanotube structure has a high surface area to volume ratio and thus may easily become stuck to other objects. During the surface treatment, the carbon nanotube structure is shrunk into a carbon nanotube string after the organic solvent is volatilized, due to factors such as surface tension. The surface area to volume ratio and diameter of the treated carbon nanotube string is reduced. The strength and toughness of the carbon nanotube structure is improved. The organic solvent may be a volatile organic solvent, such as ethanol, methanol, acetone, dichloroethane, chloroform, or any combination thereof. A diameter of each of the carbon nanotube wires 240 is approximately from 0.5 nm to 100 μm.

In step (c), further or alternatively, the carbon nanotube structure can be treated with mechanical force (for example, a conventional spinning process), to acquire a carbon nanotube wire in a twisted shape as shown in FIG. 4.

In step (d), distances between the carbon nanotube wires 240 can be set according to the desired optical transparent property of the touch panel 20. In the present embodiment, the distances between the carbon nanotube wires 240 are substantially uniform, and such distance is approximately in range from 5 nm to 1 mm.

In step (d), the method for placing the carbon nanotube wires 240 includes two process types. The first type includes the substeps of: separately and parallel disposing a plurality of carbon nanotube wires 240 along the first direction L1 on the first surface 221 of the base 22; separately and parallel disposing another given carbon nanotube wires 240 along the second direction L2 on the first surface 221 of the base 22. An angle between the first direction L1 and the second direction L2 is in a range from greater than 0° to less than or equal to 90°. The second type of process includes the substeps of intersecting a plurality of carbon nanotube wires 240, thereby the carbon nanotube wires forming a network.

It is to be noted that the shape of the substrate 22 and the transparent conductive layer 24 is chosen according to the requirements of the touch field of the touch panel 20. Generally, the shape of the touch field may be triangular or rectangular. In the present embodiment, the shapes of the touch field, the substrate 22, and the transparent conductive layer 24 are all rectangular.

The opposite ends of the carbon nanotube wires 240 being arranged along the first-direction L1 are electrically connected to the first electrodes 28. The opposite ends of the carbon nanotube wires 240 being arranged along the second-direction L2 are and electrically connected to the second electrodes 29, thereby forming an equipotential surface on the transparent conductive layer 24. In this embodiment, the substrate 22 is a glass substrate. The first-electrodes 28 and the second-electrodes 29 are strip-shaped and can be formed by metallic layers, conductive resin layers, carbon nanotube films or any other suitable materials. The electrodes 28 and 29 are disposed directly on a surface of the transparent conductive layer 24, and opposite to the substrate 22. The electrodes 28 and 29 are, beneficially, formed by one or more of spraying, electrical deposition, and electroless deposition methods. Moreover, the electrodes 28 and 29 can also be adhered to the surface of the transparent conductive layer 24, e.g., by a silver-based slurry.

Further, in order to prolong operational life span and restrict coupling capacitance of the touch panel 20, the transparent protective film 26 is disposed on the electrodes 28 and 29, and the transparent conductive layer 24. The material of the transparent protective film 26 can be selected from a group consisting of silicon nitride, silicon dioxide, benzocyclobutenes, polyester, plastic, and polyethylene terephthalate.

In the present embodiment, the transparent protective film 26 is silicon dioxide and receives a surface hardening treatment to protect the electrodes 28 and the transparent conductive layer 24 from being scratched when in use. The hardness and thickness of the transparent protective film 26 are selected according to practical needs. The transparent protective film 26 is adhered to the transparent conductive layer 24, e.g., via an adhesive.

The touch panel 20 can further include a shielding layer 25 disposed on the second surface 222 of the substrate 22. The material of the shielding layer 25 can be indium tin oxide, antimony tin oxide, carbon nanotube film, and/or another conductive material. In the present embodiment, the shielding layer 25 is a carbon nanotube film. The carbon nanotube film includes a plurality of carbon nanotubes, and the orientation of the carbon nanotubes therein may be set as desired determined. In the present embodiment, the carbon nanotubes in the carbon nanotube film of the shielding layer 25 are arranged along a same direction. The carbon nanotube film is connected to ground and acts as a shield, thus enabling the touch panel 20 to operate without interference (e.g., electromagnetic interference).

Figure 6:
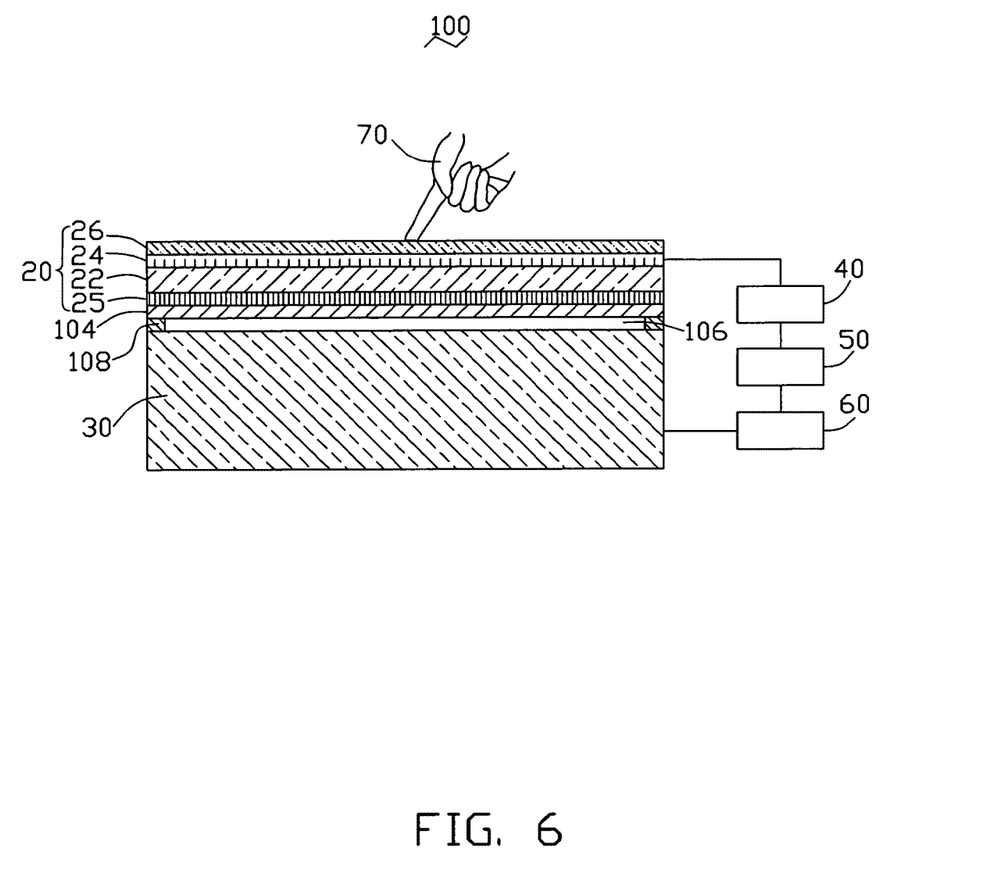
FIG. 6 is a schematic assembled cross-sectional view of the touch panel of the present embodiment used with a display element of a display device.

Referring to FIG. 6, a display device 100 includes the touch panel 20, a display element 30, a touch panel controller 40, a central processing unit (CPU) 50, and a display element controller 60. The touch panel 20 is connected to the touch panel controller 40 by an external circuit. The touch panel 20 can be spaced at a distance 106 from the display element 30 or installed directly on the display element 30. The touch panel controller 40, the CPU 50 and the display element controller 60 are electrically connected. The CPU 50 is connected to the display element controller 60 to control the display element 30.

The display element 30 can be, e.g., a liquid crystal display, field emission display, plasma display, electroluminescent display, vacuum fluorescent display, cathode ray tube, or other display device.

When the shielding layer 25 is disposed on the second surface 222 of the substrate 22, a passivation layer 104 is disposed on and in contact with a surface of the shielding layer 25, and opposite to the substrate 22. The material of the passivation layer 104 can, for example, be silicon nitride or silicon dioxide. The passivation layer 104 can be spaced at a distance from the display element 30 or instead can be directly installed on the display element 30. When the passivation layer 104 is spaced from the display element 30, understandably, two or more spacers 108 can be used between the passivation layer 104 and the display element 30. Thereby, an air gap 106 is provided between the passivation layer 104 and the display element 30. The passivation layer 104 protect the shielding layer 25 from chemical damage (e.g., humidity of the surrounding) or mechanical damage (e.g., scratching during fabrication of the touch panel).

In operation, voltages are applied to the electrodes 28 and 29, respectively. A user operates the display device 100 by pressing or touching the transparent protective film 26 of the touch panel 20 with a touch tool, such as a finger, or an electrical pen/stylus 70, while visually observing the display element 20 through the touch panel 20. In the illustration, the touch tool is the user's finger 70. Due to an electrical field of the user, a coupling capacitance forms between the user and the transparent conductive layer 24. For high frequency electrical current, the coupling capacitance is a conductor, and thus the touch tool 70 takes away a little current from the touch point. Currents flowing through the electrodes 28 and 29 cooperatively replace the current lost at the touch point. The quantity of current supplied by each of electrodes 28 and 29 is directly proportional to the distances from the touch point to the electrodes 28 and 29. The touch panel controller 40 is used to calculate the proportion of the four supplied currents, thereby detecting coordinates of the touch point on the touch panel 20. Then, the touch panel controller 40 sends the coordinates of the touch point to the CPU 50. The CPU 50 receives and processed the coordinates into a command. Finally, the CPU 50 sends out the command to the display element controller 60. The display element controller 60 controls the display of the display element 30 accordingly.

The properties of the carbon nanotubes provide superior toughness, high mechanical strength, and uniform conductivity to the carbon nanotube wires. Thus, the touch panel and the display device using the same adopting the carbon nanotube wires as the conductive layer are durable and highly conductive. Furthermore, since the carbon nanotubes have excellent electricity conductive property, the carbon nanotube layer formed by a plurality of carbon nanotube wires parallel to each other and spaced therebetween has a uniform resistance distribution, and thus the touch panel and the display device using the same adopting the carbon nanotube layer have an improved sensitivity and accuracy.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel comprising:
   a substrate;
   a transparent conductive layer located on a surface of the substrate, the transparent conductive layer comprising a first plurality of carbon nanotube wires spaced from each other and arranged along a first direction and a second plurality of carbon nanotube wires spaced from each other and arranged along a second direction, the first plurality of carbon nanotube wires directly contacting the second plurality of carbon nanotube wires;
   two first electrodes electrically connected to the first plurality of carbon nanotube wires; and
   two second electrodes electrically connected to the second plurality of carbon nanotube wires.

2. The touch panel as claimed in claim 1, wherein an angle between the first direction and the second direction, is in a range from greater than 0° to less than or equal to 90°.

3. The touch panel as claimed in claim 1, wherein a diameter of each carbon nanotube wire is in an approximate range from 0.5 nanometers to 100 micrometers.

4. The touch panel as claimed in claim 1, wherein a distance between adjacent carbon nanotube wires is in an approximate range from 5 nanometers to 1 millimeter.

5. The touch panel as claimed in claim 1, wherein each of the carbon nanotube wires comprises a plurality of successively carbon nanotube segments joined end to end by the van der Waals attractive force therebetween and each of the carbon nanotube segments comprises a plurality of successively carbon nanotubes joined end to end.

6. The touch panel as claimed in claim 5 wherein the carbon nanotubes are selected from the group consisting of single-walled carbon nanotubes with a diameter that is in an approximate range from 0.5 nanometers to 50 nanometers, double-walled carbon nanotubes with a diameter that is in an approximate range from 1 nanometers to 50 nanometers, and multi-walled carbon nanotubes with a diameter that is in an approximate range from 1.5 nanometers to 50 nanometers.

7. The touch panel as claimed in claim 1, wherein the electrodes are disposed on a first transparent conductive layer surface.

8. The touch panel as claimed in claim 7, wherein the electrodes are metal electrodes and are adhered to the first transparent conductive layer surface by a silver-based slurry.

9. The touch panel as claimed in claim 1, further comprising a transparent protective film disposed on the surface of the transparent conductive layer.

10. The touch panel as claimed in claim 9, wherein a material of the transparent protective film is selected from the group consisting of silicon nitrides, silicon dioxides, benzocyclobutenes, polyester films, and polyethylene terephthalates.

11. The touch panel as claimed in claim 1, wherein a material of the substrate is selected from the group consisting of glass, quartz, diamond, and plastic.

12. The touch panel as claimed in claim 1, further comprising a shielding layer disposed on a second surface of the substrate.

13. The touch panel as claimed in claim 12, wherein a material of the shielding layer is selected from the group consisting of indium tin oxides, antimony tin oxides, and carbon nanotube films.

14. The touch panel as claimed in claim 1, wherein the touch panel is planar or curved.

15. A display device comprising:
a touch panel comprising:
a substrate;
a transparent conductive layer located on a surface of the substrate, the transparent conductive layer comprising a first plurality of carbon nanotube wires spaced from each other and arranged along a first direction and a second plurality of carbon nanotube wires spaced from each other and arranged along a second direction, the first plurality of carbon nanotube wires directly contacting the second plurality of carbon nanotube wires;
two first electrodes electrically connected to the first plurality of carbon nanotube wires;
two second electrodes electrically connected to the second plurality of carbon nanotube wires; and
a display element adjacent to the touch panel.

16. The display device as claimed in claim 15, further comprising a touch panel controller, a central processing unit, and a display element controller that are in communication to each other.

17. The display device as claimed in claim 15, wherein the display element is selected from the group consisting of liquid crystal displays, field emission displays, plasma displays, electroluminescent displays, vacuum fluorescent displays, and cathode ray tubes.

18. The display device as claimed in claim 15, wherein there is a space between the touch panel and the display element.

19. The display device as claimed in claim 15, further comprising a passivation layer disposed between the touch panel and the display element.

20. A touch panel comprising:
a substrate;
a transparent conductive layer located on a surface of the substrate, the transparent conductive layer comprising a first plurality of carbon nanotube wires spaced from each other and arranged along a first direction and a second plurality of carbon nanotube wires spaced from each other and arranged along a second direction, the first plurality of carbon nanotube wires directly contacting the second plurality of carbon nanotube wires, the first direction being crossed with the second direction;
two first electrodes directly and electrically connected to the first plurality of carbon nanotube wires; and
two second electrodes directly electrically connected to the second plurality of carbon nanotube wires.

* * * * *